(12) United States Patent
Canis (10) Patent No.: US 8,296,055 B2
(45) Date of Patent: Oct. 23, 2012

(54) METHOD AND SYSTEM FOR POSITIONAL COMMUNICATION

(76) Inventor: Randy Lawrence Canis, Chesterfield, MO (US)

(*) Notice: Subject to any disclaimer, the term of this patent is extended or adjusted under 35 U.S.C. 154(b) by 898 days.

(21) Appl. No.: 12/131,419

(22) Filed: Jun. 2, 2008

(65) Prior Publication Data

US 2009/0299628 A1    Dec. 3, 2009

(51) Int. Cl.
*G01C 21/00*    (2006.01)
(52) U.S. Cl. ............. 701/408; 701/487; 701/300
(58) Field of Classification Search .......... 701/207–209, 701/213, 215, 300–302, 408, 409, 468, 487; 342/357.2, 361, 357.56; 340/993
See application file for complete search history.

(56) References Cited

U.S. PATENT DOCUMENTS

| | | | | |
|---|---|---|---|---|
| 5,905,947 | A * | 5/1999 | Stein | 455/90.3 |
| 7,805,243 | B2 * | 9/2010 | Gasbarro et al. | 701/213 |
| 8,065,077 | B2 * | 11/2011 | Karlsson | 701/426 |
| 8,108,144 | B2 * | 1/2012 | Forstall et al. | 340/988 |
| 8,145,183 | B2 * | 3/2012 | Barbeau et al. | 455/404.1 |

* cited by examiner

*Primary Examiner* — Richard M. Camby
(74) *Attorney, Agent, or Firm* — Randy Canis (57) ABSTRACT

Methods and systems for positional communication are described. In one embodiment, a plurality of electronic communications for a user may be accessed. Positional information associated with the user may be accessed. User interface data for the plurality of electronic communications may be provided based on the positional information.

20 Claims, 10 Drawing Sheets

METHOD AND SYSTEM FOR POSITIONAL COMMUNICATION

BACKGROUND

A user may amass a number of electronic communications from a number of different users. The user may seek to view and/or respond to particular electronic communications.

BRIEF DESCRIPTION OF THE DRAWINGS

Some embodiments are illustrated by way of example and not limitation in the figures of the accompanying drawings in which.

DETAILED DESCRIPTION

Example methods and systems for positional communication are described. In the following description, for purposes of explanation, numerous specific details are set forth in order to provide a thorough understanding of example embodiments. It will be evident, however, to one skilled in the art that embodiments of the present invention may be practiced without these specific details.

In an example embodiment, a plurality of electronic communications for a user may be accessed. Positional information associated with the user may be accessed. User interface data for the plurality of electronic communications may be provided based on the positional information.

Figure 1:
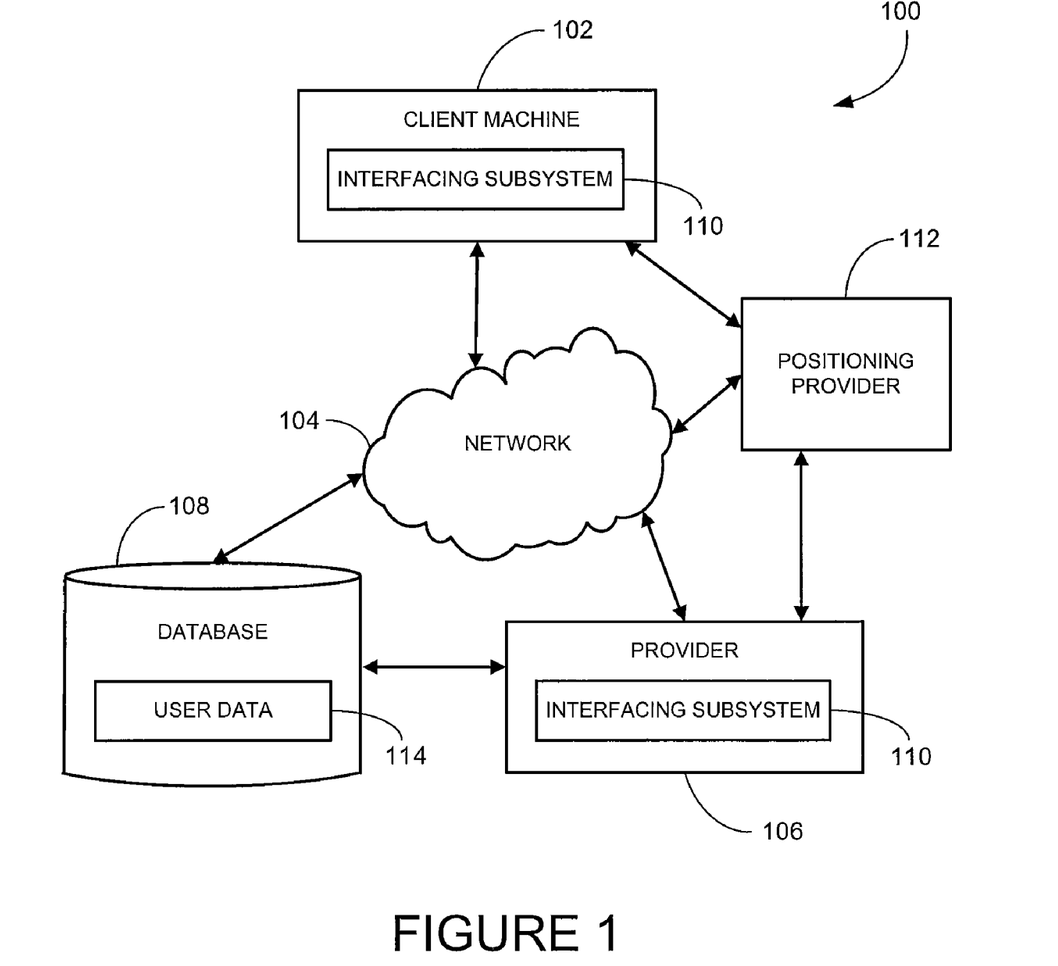
FIG. 1 is a block diagram of a system, according to an example embodiment.

FIG. 1 illustrates an example system 100 in which a client machine 102 may be in communication with a provider 106 over a network 104. A user may operate the client machine 102 to send and/or receive electronic communications from one or more additional users. Examples of the client machine 102 include a set-top box (STB), a receiver card, a mobile telephone, a personal digital assistant (PDA), a display device, a portable gaming unit, and a computing system; however other devices may also be used.

The network 104 over which the client machine 102 and the provider 106 are in communication may include a Global System for Mobile Communications (GSM) network, an Internet Protocol (IP) network, a Wireless Application Protocol (WAP) network, a WiFi network, or a IEEE 802.11 standards network as well as various combinations thereof. Other conventional and/or later developed wired and wireless networks may also be used.

The provider 106 may manage the electronic communications on behalf of a user. The provider 106 may also manage the electronic communications of one or more additional users. However, other providers not associated with the user of the client machine 102 may manage electronic communications of additional users. Examples of providers 106 include MICROSOFT, YAHOO, and GOOGLE.

An interfacing subsystem 110 may be deployed within the client machine 102 and/or the provider 106 to enable providing of user interface data for the electronic communications of the user. The interfacing subsystem 110 may be used to provide user interface data based on positional information.

The provider 106 may also be in communication with a database 108. The database 108 may include user data 114 include information regarding users of the provider 106.

A positioning provider 112 may be in communication with to obtain positional information. Examples of positioning providers 112 include portable GPS devices, mobile phones, and the like. The positioning provider 112 may be made integral with the client machine 102 and/or the provider 106.

Figure 2:
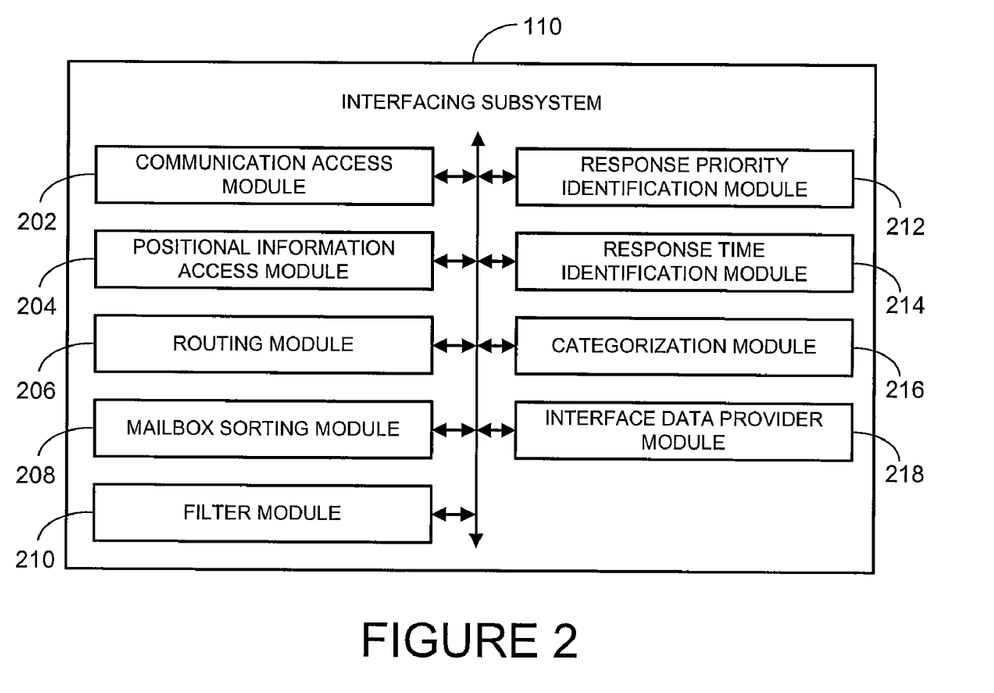
FIG. 2 is a block diagram of an example interfacing subsystem that may be deployed within the system of FIG. 1 according to an example embodiment.

FIG. 2 illustrates an example interfacing subsystem 110 that may be deployed in the client machine 102 and/or the provider 106 of the system 100 (see FIG. 1) or otherwise deployed in another system. The interfacing subsystem 110 may include a communication access module 202, a positional information access module 204, a routing module 206, a mailbox sorting module 208, a filter module 210, a response priority identification module 212, a response time identification module 214, a categorization module 216, and/or an interface data provider module 218. Other modules may also be included.

The communication access module 202 accesses electronic communications for a user. The electronic communications may include mail messages, instant messages, electronic facsimiles, or the like. The positional information may be received from the user. A positioning request may be provided to the positioning provider 112 and the positional information may be received from the positioning provider 112.

The positional information access module 204 accesses positional information associated with the user. The positional information may include GPS data, GPRS data, wave point data, and/or triangulation data. Other positional information may also be used.

The routing module 206 accesses route history data associated with the user; identifies a route of the user based on the positional information, and/or receives route information from the user.

The mailbox sorting module 208 sorts a mailbox containing the electronic communications based on the accessing of the positional information. The filter module 210 filters the electronic communications based on the positional information.

The response priority identification module 212 identifies a response priority for the electronic communications based on the positional information. The response time identification module 214 identifies a response time for the electronic communications based on the positional information. The categorization module 216 categorizes multiple additional users into one or more categories based on the positional information.

The interface data provider module 218 provides user interface data for the electronic communications based on the positional information. The user interface data may be provided through an application programming interface (API) or may be otherwise provided. The providing of the user interface data may include providing a user interface to the electronic communications based on the positional information. The providing of the user interface data may be based on the sorting of the mailbox, filtering of the electronic communications, identification of the response priority, identification of the response time, identification of a route, route information, and/or categorization of multiple users. The user interface data may be otherwise provided.

Figure 3:
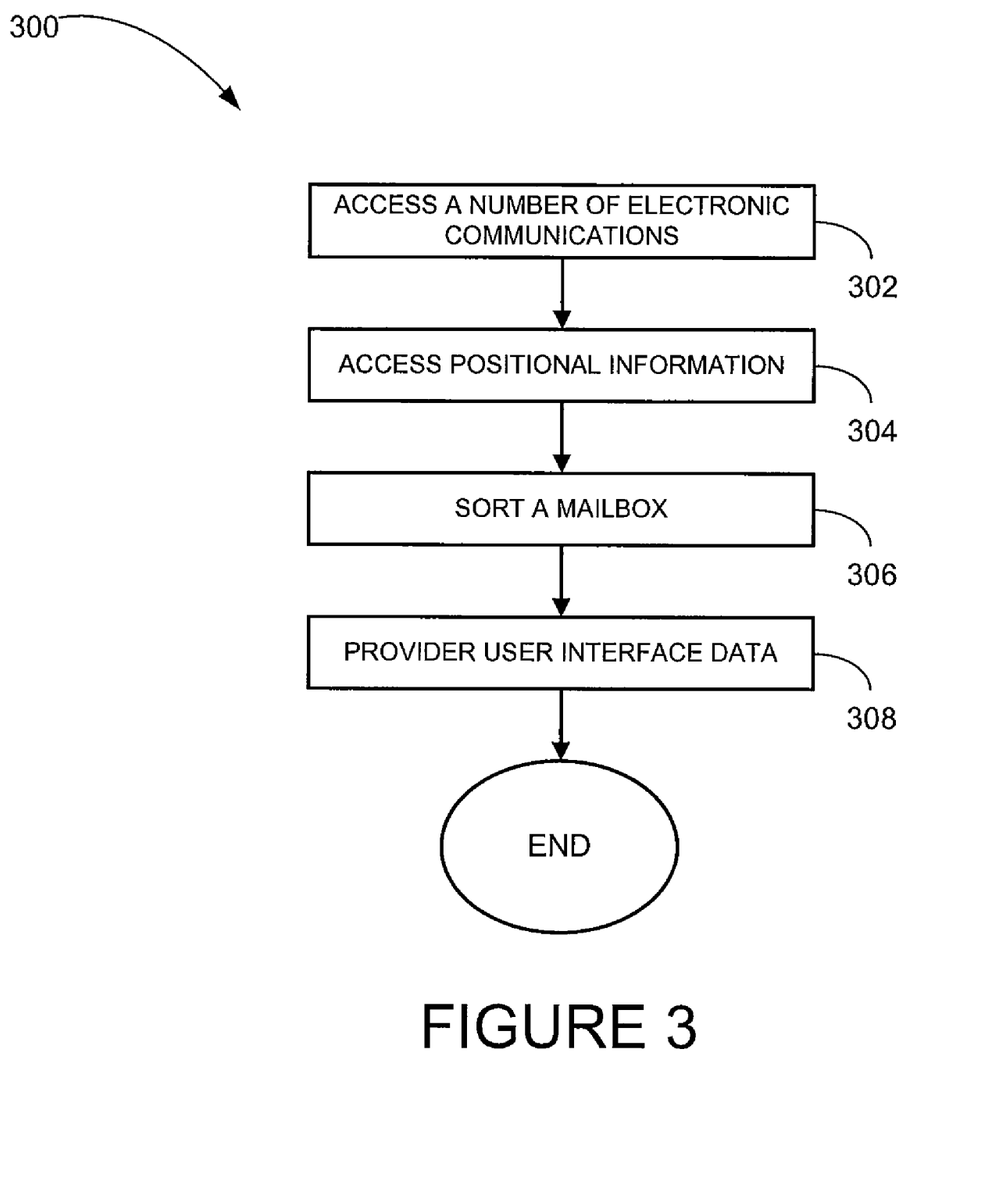
FIGS. 3-9 are example flowcharts illustrating a method for communication management according to example embodiments.

FIG. 3 illustrates a method 300 for communication management according to an example embodiment. The method 300 may be performed by the client machine 102 and/or the provider 106 of the system 100 (see FIG. 1) or otherwise performed.

Electronic communications for a user are accessed at block 302. The electronic communications may include a mail message, an instant message, an electronic facsimile, or the like. Positional information associated with the user is accessed at block 304. The positional information may include, by way of example, GPS data, GPRS data, wave point data, triangulation data, or the like. Other positional information may also be used.

The positional information may be accessed by being received from the user. For example, the user may specify graphically (e.g., on a map) a current location, may provide latitude and longitude, or may otherwise provided the positional information. A positioning request may be provided to the positioning provider 112 and the positional information may be received from the positioning provider 112 in response. The positional information may be accessed otherwise.

A mailbox containing the electronic communications is sorted based on the accessing of the positional information at block 306.

User interface data for the electronic communications is provided based on the sorting of the mailbox at block 308. The user interface data may be provided through an application programming interface (API) or otherwise provided. A user interface to the electronic communications may be provided based on the positional information during the operations at block 308.

Figure 4:
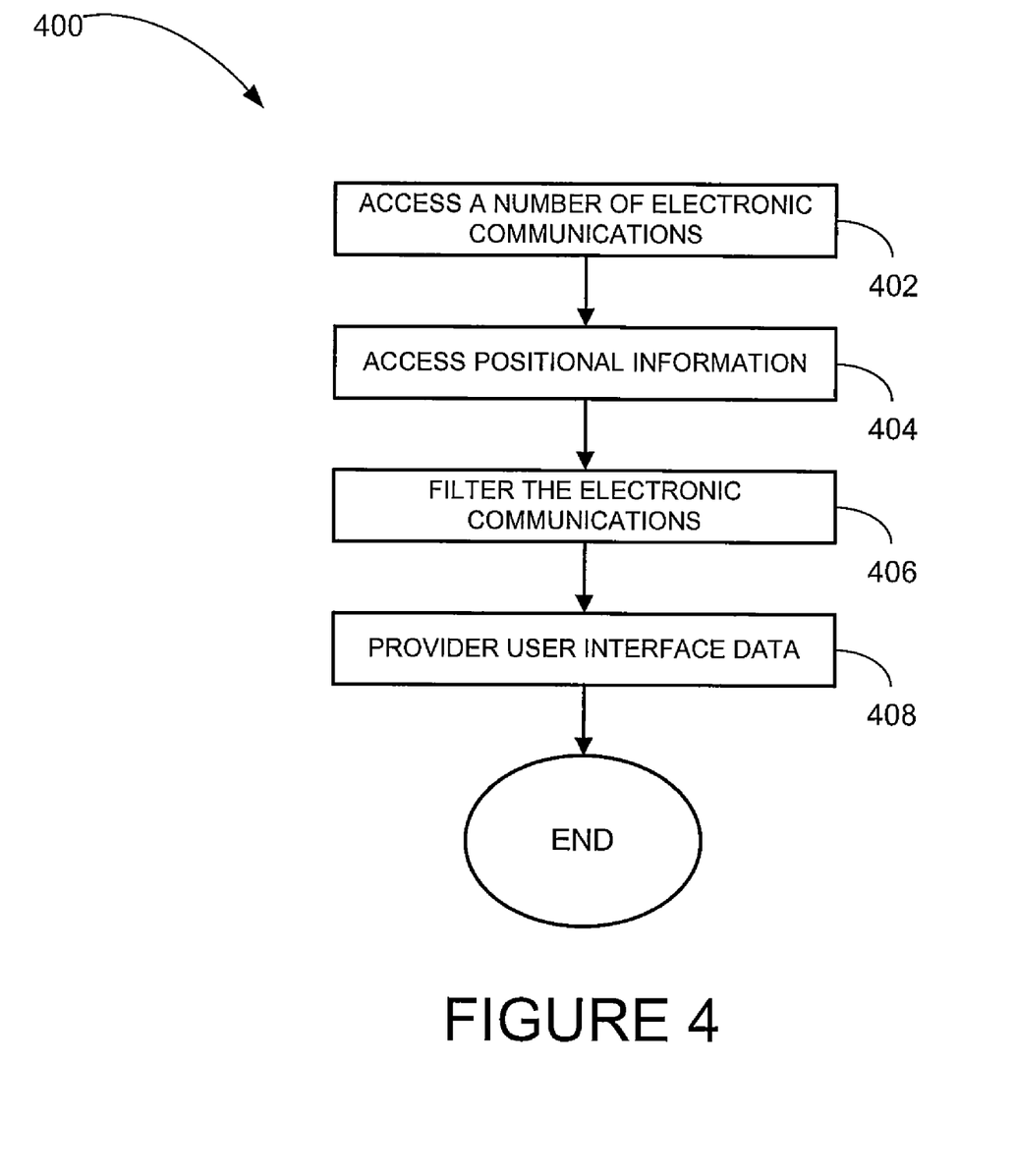

FIG. 4 illustrates a method 400 for communication management according to an example embodiment. The method 400 may be performed by the client machine 102 and/or the provider 106 of the system 100 (see FIG. 1) or otherwise performed.

Electronic communications for a user are accessed at block 402. The electronic communications may include a mail message, an instant message, an electronic facsimile, or the like.

Positional information associated with the user is accessed at block 404. The positional information may be accessed by being received from the user. For example, the user may specify graphically (e.g., on a map) a current location, may provide latitude and longitude, or may otherwise provided the positional information. A positioning request may be provided to the positioning provider 112 and the positional information may be received from the positioning provider 112 in response. The positional information may be accessed otherwise.

The electronic communications is filtered based on the positional information at block 406.

User interface data for the electronic communications is provided based on the filtering of the electronic communications at block 408. The user interface data may be provided through an API or otherwise provided. A user interface to the electronic communications may be provided based on the positional information during the operations at block 408.

Figure 5:
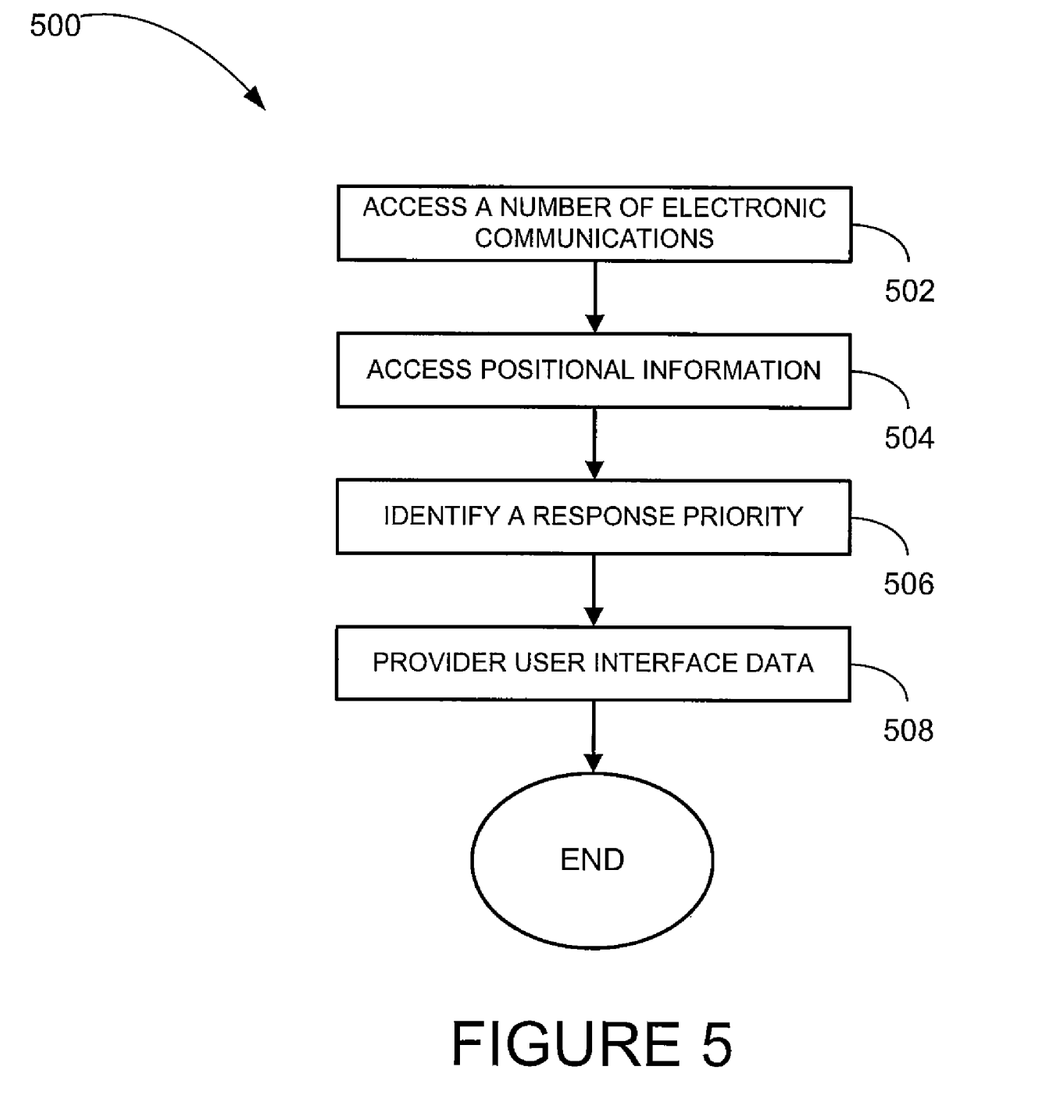

FIG. 5 illustrates a method 500 for communication management according to an example embodiment. The method 500 may be performed by the client machine 102 and/or the provider 106 of the system 100 (see FIG. 1) or otherwise performed.

Electronic communications for a user are accessed at block 502. The electronic communications may include a mail message, an instant message, an electronic facsimile, or the like.

Positional information associated with the user is accessed at block 504. The positional information may be accessed by being received from the user. For example, the user may specify graphically (e.g., on a map) a current location, may provide latitude and longitude, or may otherwise provided the positional information. A positioning request may be provided to the positioning provider 112 and the positional information may be received from the positioning provider 112 in response. The positional information may be accessed otherwise.

A response priority for the electronic communications is identified based on the positional information at block 506.

User interface data for the electronic communications is provided based on the identifying of the response priority at block 508. The user interface data may be provided through an API or otherwise provided. A user interface to the electronic communications may be provided based on the positional information during the operations at block 508.

Figure 6:
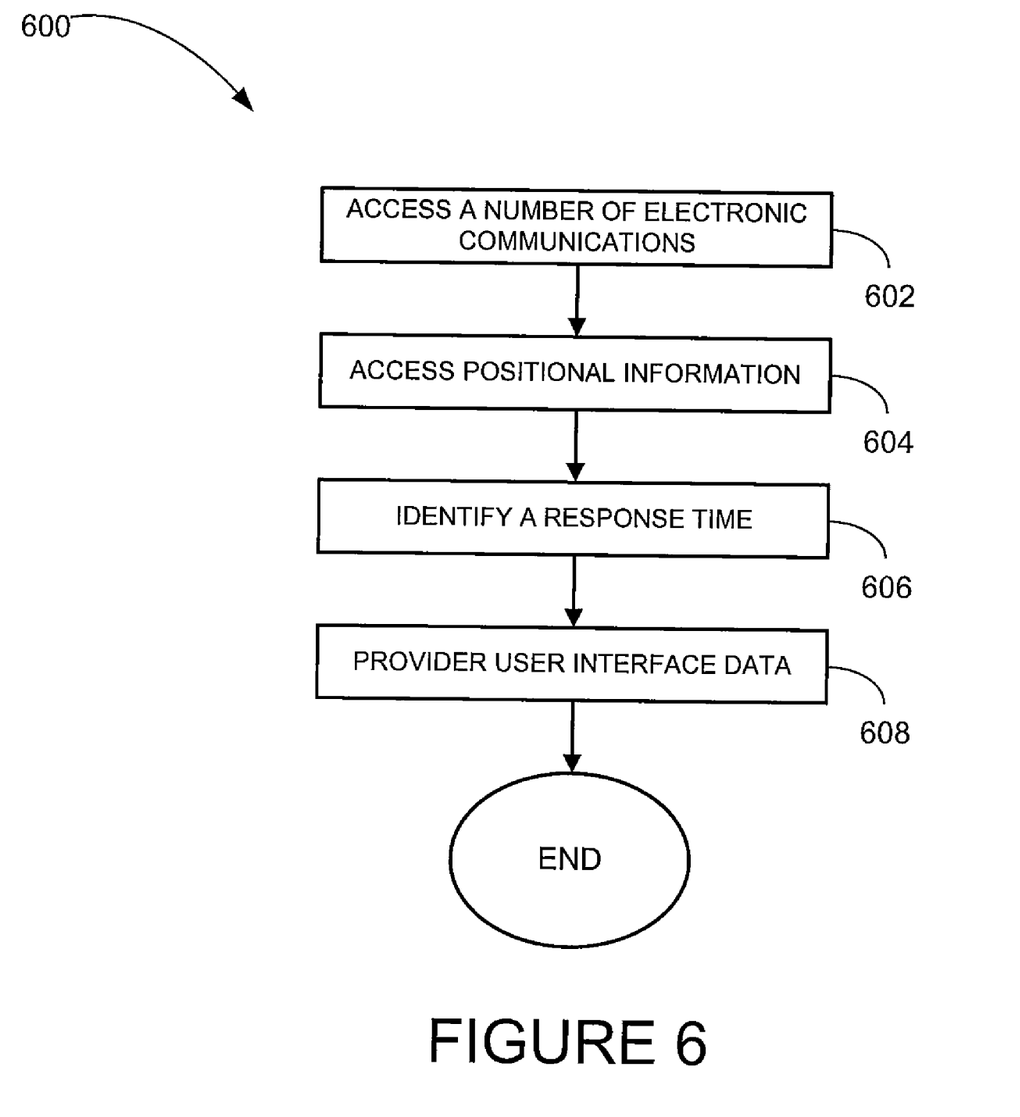

FIG. 6 illustrates a method 600 for communication management according to an example embodiment. The method 600 may be performed by the client machine 102 and/or the provider 106 of the system 100 (see FIG. 1) or otherwise performed.

Electronic communications for a user are accessed at block 602. The electronic communications may include a mail message, an instant message, an electronic facsimile, or the like.

Positional information associated with the user is accessed at block 604. The positional information may be accessed by being received from the user. For example, the user may specify graphically (e.g., on a map) a current location, may provide latitude and longitude, or may otherwise provided the positional information. A positioning request may be provided to the positioning provider 112 and the positional information may be received from the positioning provider 112 in response. The positional information may be accessed otherwise.

A response time for one or more of the electronic communications is identified based on the positional information at block 606.

User interface data for the electronic communications is provided based on identification of the response time at block 608. The user interface data may be provided through an API or otherwise provided. A user interface to the electronic communications may be provided based on the positional information during the operations at block 608.

Figure 7:
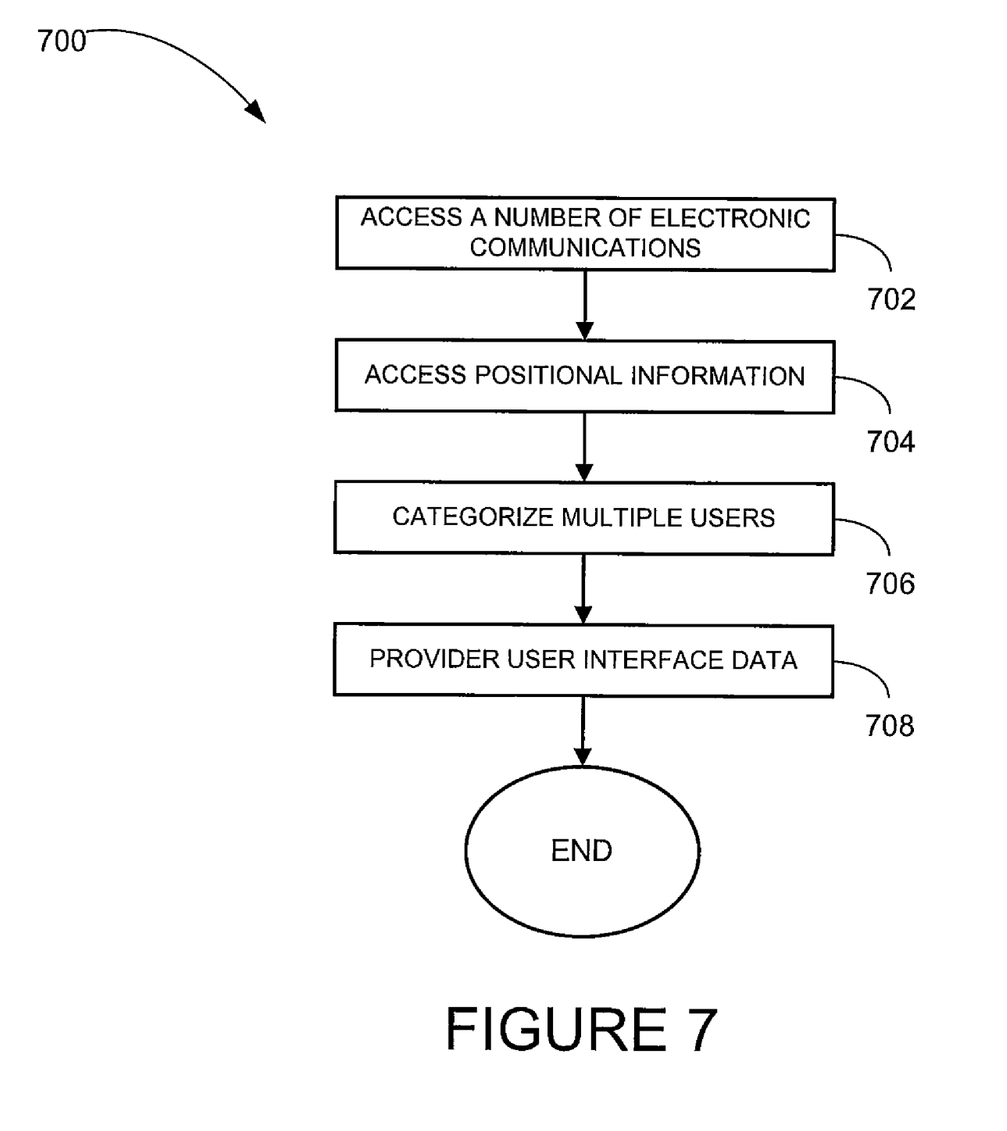

FIG. 7 illustrates a method 700 for communication management according to an example embodiment. The method 700 may be performed by the client machine 102 and/or the provider 106 of the system 100 (see FIG. 1) or otherwise performed.

Electronic communications for a user are accessed at block 702. The electronic communications may include a mail message, an instant message, an electronic facsimile, or the like.

Positional information associated with the user is accessed at block 704. The positional information may be accessed by being received from the user. For example, the user may specify graphically (e.g., on a map) a current location, may provide latitude and longitude, or may otherwise provided the positional information. A positioning request may be provided to the positioning provider 112 and the positional information may be received from the positioning provider 112 in response. The positional information may be accessed otherwise.

A number of additional users are categorized into one or more categories based on the positional information at block 706.

User interface data for the electronic communications is provided based on the categorizing of the additional users at block 708. The user interface data may be provided through an API or otherwise provided. A user interface to the electronic communications may be provided based on the positional information during the operations at block 708.

Figure 8:
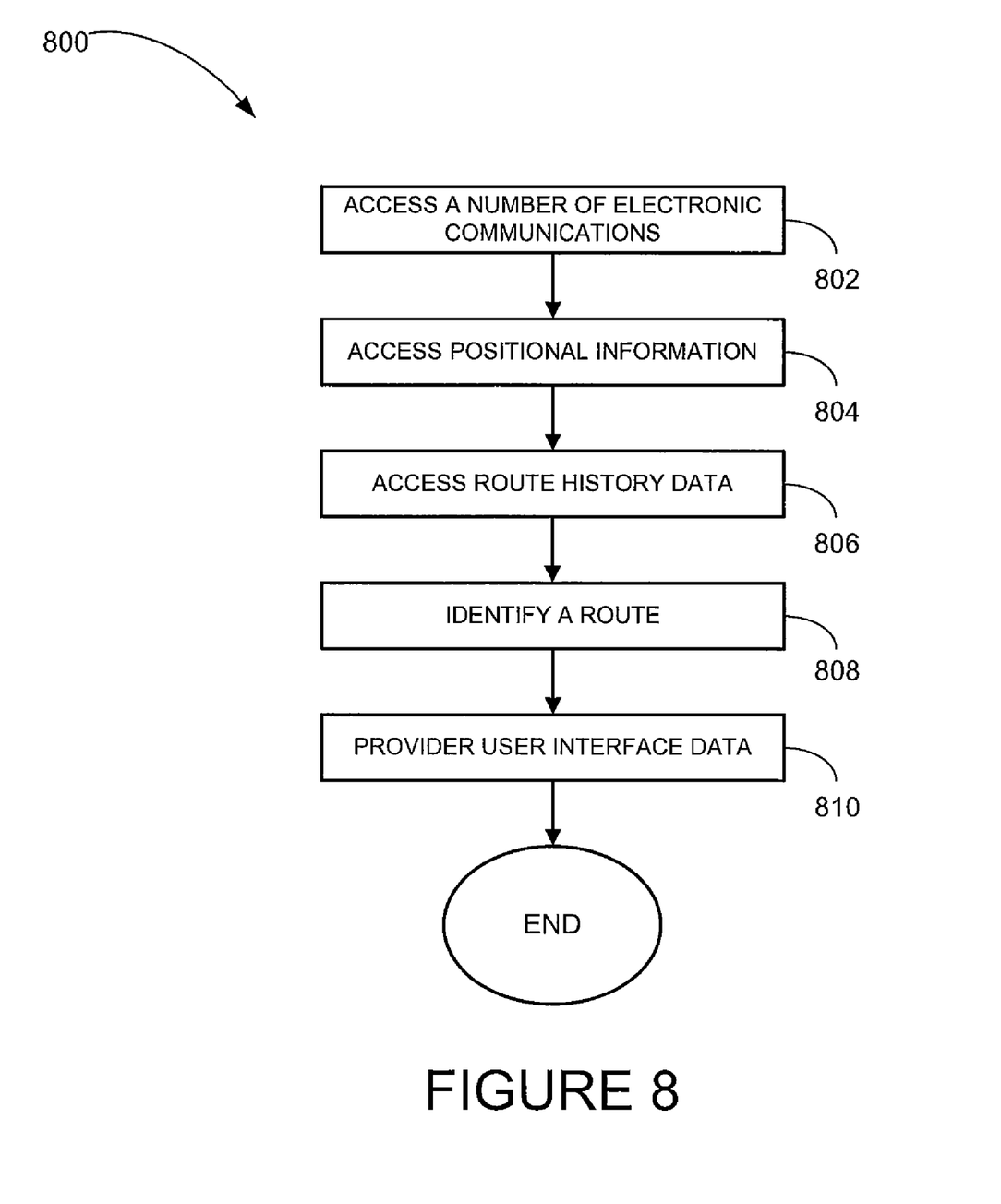

FIG. 8 illustrates a method 800 for communication management according to an example embodiment. The method 800 may be performed by the client machine 102 and/or the provider 106 of the system 100 (see FIG. 1) or otherwise performed.

Electronic communications for a user are accessed at block 802. The electronic communications may include a mail message, an instant message, an electronic facsimile, or the like.

Positional information associated with the user is accessed at block 804. The positional information may be accessed by being received from the user. For example, the user may specify graphically (e.g., on a map) a current location, may provide latitude and longitude, or may otherwise provided the positional information. A positioning request may be provided to the positioning provider 112 and the positional information may be received from the positioning provider 112 in response. The positional information may be accessed otherwise.

Route history data associated with the user may be accessed at block 806.

A route of the user may be identified based on the positional information and/or the route history data at block 808.

User interface data for the electronic communications is provided based on the positional information and the identifying of the route at block 810. The user interface data may be provided through an API or otherwise provided. A user interface to the electronic communications may be provided based on the positional information during the operations at block 810.

Figure 9:
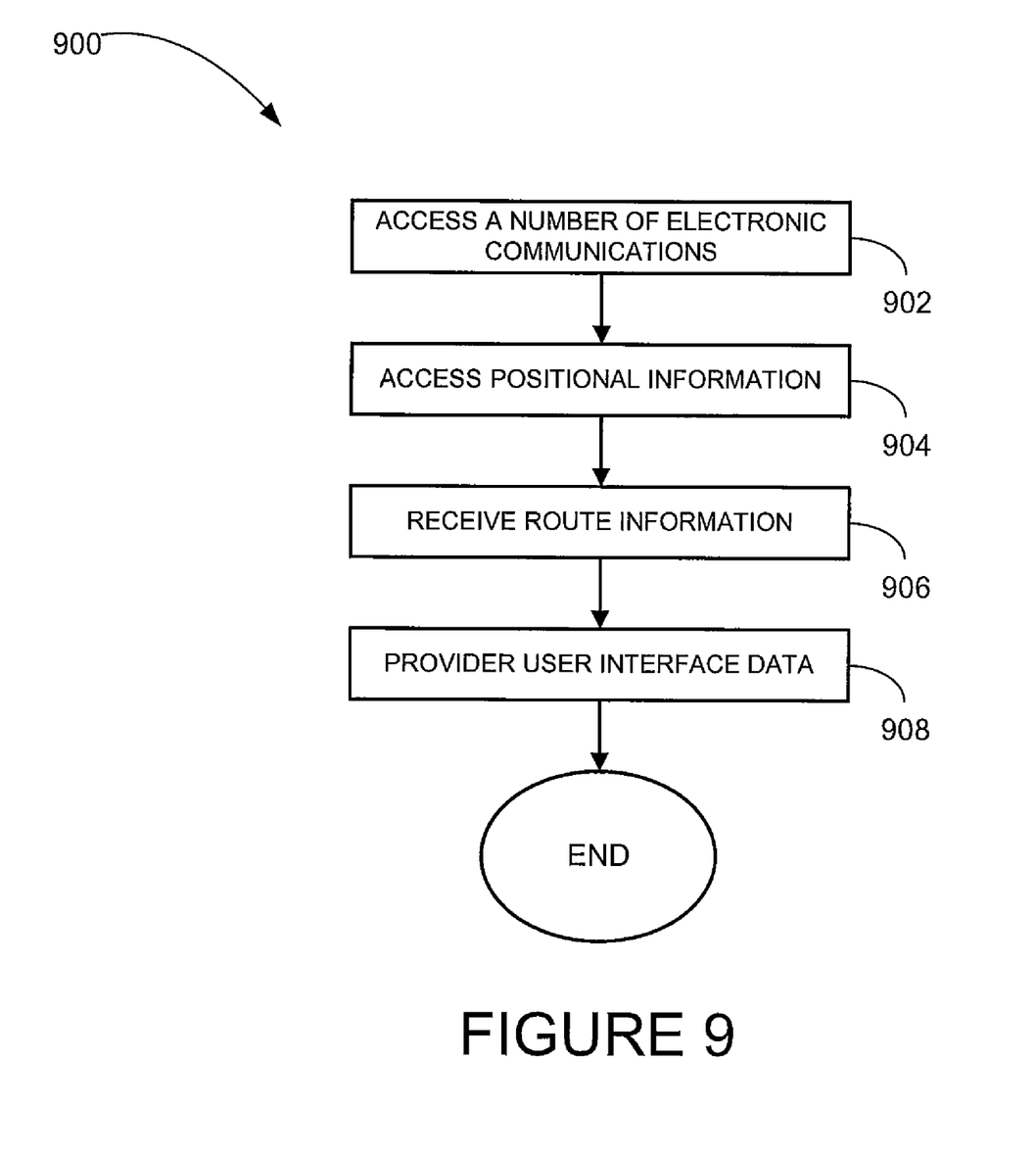

FIG. 9 illustrates a method 900 for communication management according to an example embodiment. The method 900 may be performed by the client machine 102 and/or the provider 106 of the system 100 (see FIG. 1) or otherwise performed.

Electronic communications for a user are accessed at block 902. The electronic communications may include a mail message, an instant message, an electronic facsimile, or the like.

Positional information associated with the user is accessed at block 904. The positional information may be accessed by being received from the user. For example, the user may specify graphically (e.g., on a map) a current location, may provide latitude and longitude, or may otherwise provided the positional information. A positioning request may be provided to the positioning provider 112 and the positional information may be received from the positioning provider 112 in response. The positional information may be accessed otherwise.

Route information is received from the user at block 906.

User interface data for the electronic communications is provided based on the positional information and/or route information at block 908. The user interface data may be provided through an API or otherwise provided. A user interface to the electronic communications may be provided based on the positional information during the operations at block 908.

Figure 10:
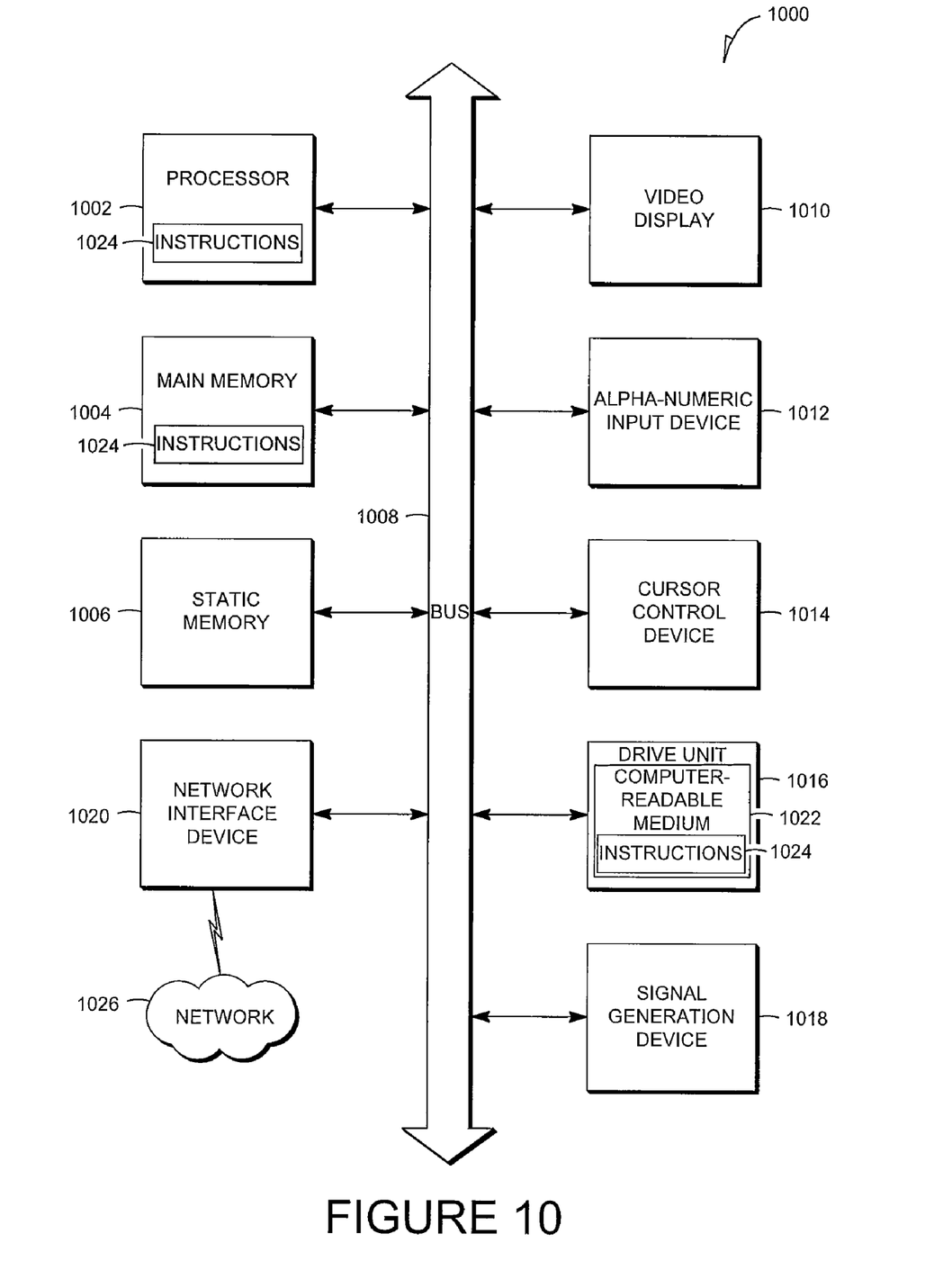
FIG. 10 is a block diagram diagrammatic representation of machine in the example form of a computer system within which a set of instructions for causing the machine to perform any one or more of the methodologies discussed herein may be executed.

FIG. 10 shows a diagrammatic representation of machine in the example form of a computer system 1000 within which a set of instructions may be executed causing the machine to perform any one or more of the methods, processes, operations, or methodologies discussed herein. The provider 106 and/or the positioning provider 112 may operate on or more computer systems 1000. The client machine 102 may include the functionality of one or more computer systems 1000.

In an example embodiment, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU) a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a cursor control device 1014 (e.g., a mouse), a drive unit 1016, a signal generation device 1018 (e.g., a speaker) and a network interface device 1020.

The drive unit 1016 includes a machine-readable medium 1022 on which is stored one or more sets of instructions (e.g., software 1024) embodying any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting machine-readable media.

The software 1024 may further be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the embodiments of the present invention. The term "machine-readable medium" shall accordingly be taken to include, but not be limited to, solid-state memories, optical and magnetic media, and carrier wave signals.

Certain systems, apparatus, applications or processes are described herein as including a number of modules or mechanisms. A module or a mechanism may be a unit of distinct functionality that can provide information to, and receive information from, other modules. Accordingly, the described modules may be regarded as being communicatively coupled. Modules may also initiate communication with input or output devices, and can operate on a resource (e.g., a collection of information). The modules be implemented as hardware circuitry, optical components, single or multi-processor circuits, memory circuits, software program modules and objects, firmware, and combinations thereof, as appropriate for particular implementations of various embodiments.

Thus, methods and systems for positional communication have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    accessing a plurality of electronic communications for a user, wherein the plurality of electronic communications includes at least one of electronic mail, instant message or electronic facsimile;
    accessing positional information associated with the user;
    processing, with a processor, an electronic communication with the positional information associated with the user;
    providing user interface data for the plurality of electronic communications based on the positional information;
    categorizing a plurality of additional users into one or more categories based on the positional information,
    wherein the providing the user interface data is based on the categorizing of the plurality of additional users.

2. The method of claim 1, wherein the accessing of the positional information comprises:
    receiving the positional information from a positioning provider.

3. The method of claim 2, further comprising:
    providing a positioning request to the positioning provider, wherein the receiving of the positional information is based on the providing of the positioning request.

4. The method of claim 1, wherein the accessing of the positional information comprises:
    receiving the positional information from the user.

5. The method of claim 1, wherein the providing of the user interface data comprises:
    providing the user interface data for the plurality of electronic communications based on the positional information through an application programming interface (API).

6. The method of claim 1, wherein the providing of the user interface data comprises:
    providing a user interface to the plurality of electronic communications based on the positional information.

7. The method of claim 1, further comprising:
    sorting a mailbox containing the plurality of electronic communications based on the accessing of the positional information,
    wherein the providing the user interface data is based on the sorting of the mailbox.

8. The method of claim 1, further comprising:
    filtering the plurality of electronic communications based on the positional information,
    wherein the providing of the user interface data is based on the filtering of the plurality of electronic communications.

9. The method of claim 1, wherein the presenting of the user interface comprises:
    identifying a response priority for the plurality of electronic communications based on the positional information,
    wherein the providing the user interface data is based on the identifying of the response priority.

10. The method of claim 1, wherein the presenting of the user interface comprises:
    identifying a response time for the plurality of electronic communications based on the positional information,
    wherein the providing the user interface data is based on the identifying of the response time.

11. The method of claim 1, further comprising:
    identifying a route of the user based on the positional information,
    wherein the providing user interface data for the plurality of electronic communications is based on the positional information and the identifying of the route.

12. The method of claim 11, further comprising:
    accessing route history data associated with the user;
    wherein the identifying of the route of the user is based on the positional information and the route history data.

13. The method of claim 1, further comprising:
    receiving route information from the user,
    wherein the providing of the user interface data for the plurality of electronic communications is based on the positional information and the route information.

14. A computer-readable medium comprising instructions, which when implemented by one or more processors perform the following operations:
    access a plurality of electronic communications for a user, wherein the plurality of electronic communications includes at least one of electronic mail, instant message or electronic facsimile;
    processing, with a processor, an electronic communication with the positional information associated with the user;
    access positional information associated with the user;
    provide user interface data for the plurality of electronic communications based on the positional information;
    categorizing a plurality of additional users into one or more categories based on the positional information,
    wherein the providing the user interface data is based on the categorizing of the plurality of additional users.

15. The computer-readable medium of claim 14 further comprising instructions, which when implemented by one or more processors perform the following operations:
    sort a mailbox containing the plurality of electronic communications based on accessing of the positional information,
    wherein providing the user interface data is based on sorting of the mailbox.

16. The computer-readable medium of claim 14 further comprising instructions, which when implemented by one or more processors perform the following operations:
    identify a route of the user based on the positional information, wherein providing user interface data for the plurality of electronic communications is based on the positional information and identifying of the route.

17. A system comprising:
a communication access module to access a plurality of electronic communications for a user, wherein the plurality of electronic communications includes at least one of electronic mail, instant message or electronic facsimile;
a positional information access module to access positional information associated with the user;
a processor to process an electronic communication with the positional information associated with the user;
an interface data provider module to provide user interface data for the plurality of electronic communications accessed by the communication access module based on the positional information accessed by the positional information access module;
a categorizing module to categorize a plurality of additional users into one or more categories based on the positional information, and
wherein the user interface data provider is to provide the user interface data based on the categorizing of the plurality of additional users.

18. The system of claim 17, further comprising:
a routing module to receive route information from the user,
wherein providing of the user interface data for the plurality of electronic communications is based on the positional information and the route information.

19. The system of claim 17, wherein the positional information includes GPS data, GPRS data, wave point data, triangulation data, or combinations thereof.

20. The system of claim 17, further comprising a wireless mobile telephone interface device.

* * * * *